United States Patent [19]

Carter

[11] 4,120,264
[45] Oct. 17, 1978

[54] SANITARY FACILITY FOR PETS
[76] Inventor: Joseph M. Carter, 11750 W. Belfort, Apt. 1307, Stafford, Tex. 77477
[21] Appl. No.: 796,034
[22] Filed: May 11, 1977
[51] Int. Cl.² .............................................. A01K 29/00
[52] U.S. Cl. ............................................................ 119/1
[58] Field of Search ............................................ 119/1
[56] References Cited
U.S. PATENT DOCUMENTS

| 2,039,783 | 5/1936 | Ebeling | 119/1 |
| 2,204,416 | 6/1940 | Kramer | 119/1 |
| 3,246,630 | 4/1966 | Dearing et al. | 119/1 |
| 3,885,523 | 5/1975 | Coleman | 119/1 |

*Primary Examiner*—Russell R. Kinsey
*Assistant Examiner*—Daniel J. Leach
*Attorney, Agent, or Firm*—Lee G. Meyer

[57] ABSTRACT

An improved sanitary facility for pets is provided for the collecting, removing and disposing of small animal excrement without the attendant mess and odor heretofore experienced. A rotatable chamber which contains pet litter, sand or other suitable material, has a first closeable opening for animal ingress and egress, and a second opening for expulsion of separated waste. Filter means, disposed circumferentially within the chamber, selectively separate solid excrement and agglomerated matter from unsoiled litter as the chamber is rotated. The separated waste is continuously urged, by the combined action of gravity and the incline of the filter means, toward a second sealable opening in the chamber. The separated matter is expelled from the chamber through the second opening and deposited in an appropriate receptacle. Means are provided to prevent rotation of the chamber during use by the animal. Means are also provided for automatically sealing the second opening to prevent odor from escaping the chamber.

7 Claims, 7 Drawing Figures

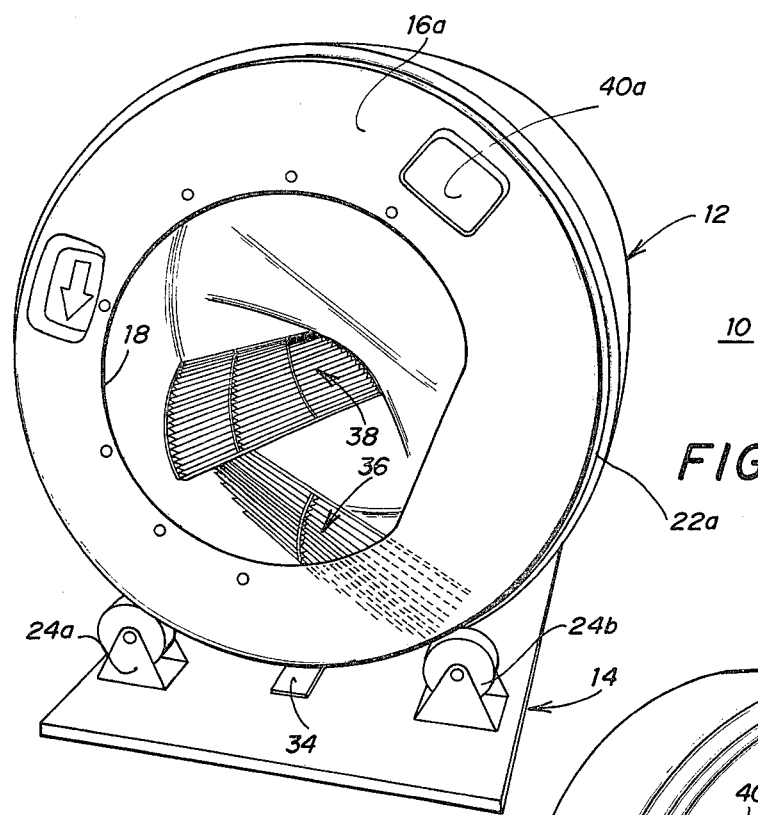
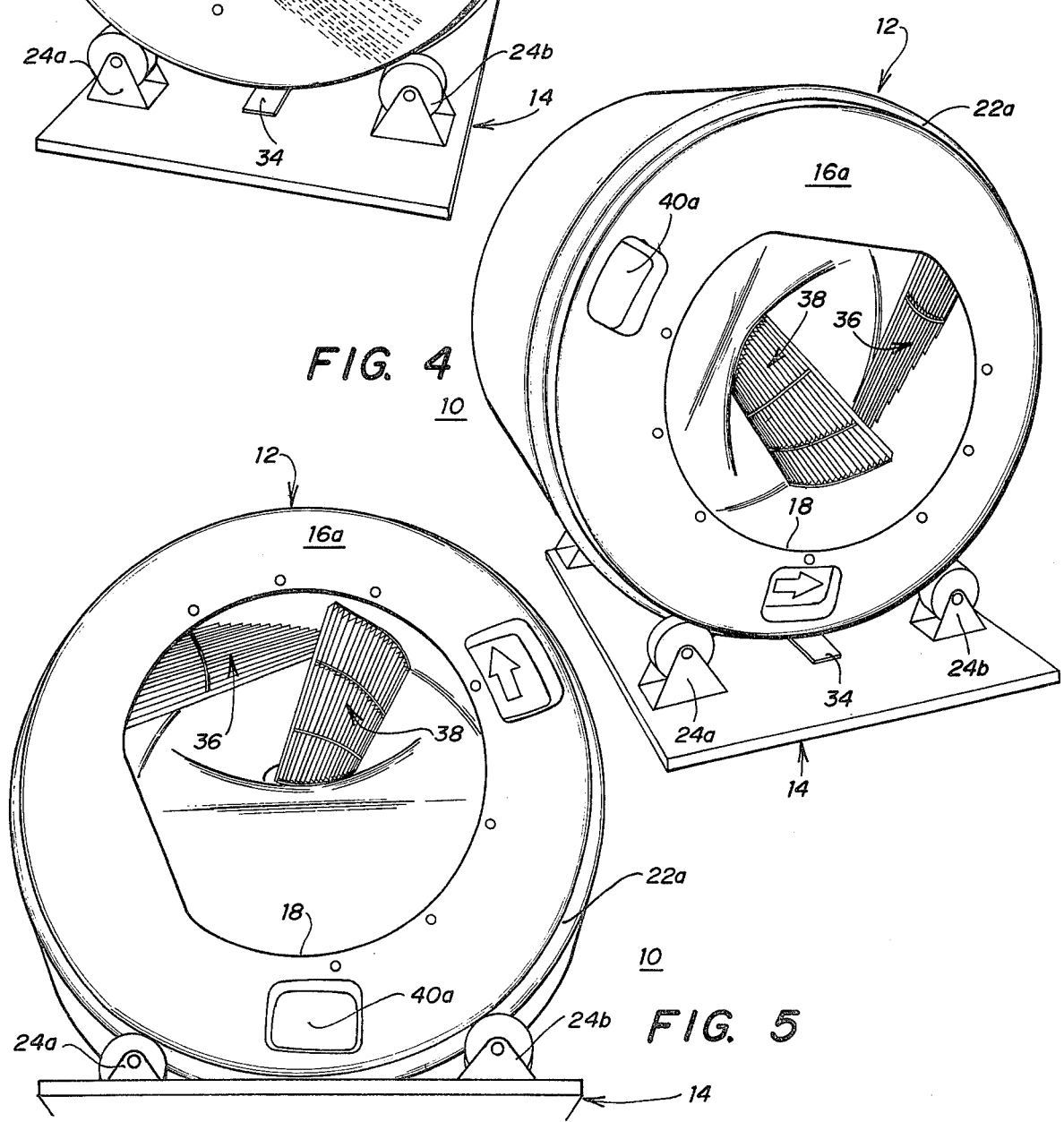
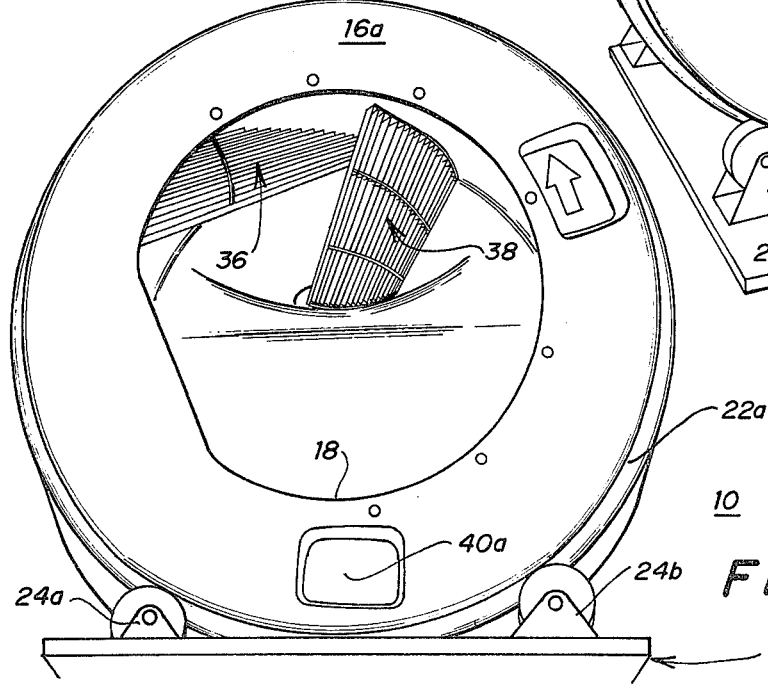

SANITARY FACILITY FOR PETS

BACKGROUND OF THE INVENTION

1. Field of the Invention

The instant invention relates to portable, indoor animal privies, and, more particularly, to indoor sanitary devices for collecting, removing and disposing of small animal excrement.

2. Prior Art

"Pet privies" and litter boxes provide a particularly unpleasant but necessary piece of equipment. Indoor litter boxes for pets, and especially for cats, are old and well known. The most comon is the "sandbox". A cardboard or wooden box is filled with sand or "litter" and placed in a secluded spot. The usual prior method of collecting and disposing of animal excrement of such indoor facilities has been to empty the sand or "litter" gravel from the tray or box by manual means.

Perforated scoops and other instruments have been developed to remove the solid waste from the litter. Unfortunately, these methods, in addition to being messy, are ineffective for completely cleaning the litter. Thus, the entire contents of the box must be disposed of periodically. To accomplish this disposal, the box or litter container must be completely lifted and the contents poured into a plastic bag or bucket. The result is spillage of the unsanitary and odiferous contents.

These tasks have been found so unpleasant by most that the privy is tolerated until the smell becomes unbearable and permeates the house before it is emptied. This condition is unsanitary, presenting a source of infection for both animal and owner. Further, even if antiseptic chemicals and odor-fighting preparations are used, it is difficult to disperse these substances throughout the litter. The open top and shallow sides make the admixing of antiseptic and air freshening chemicals with the litter particularly difficult.

Further, cats have a tendency, while performing toilet, to dig, scratch, scrape and otherwise kick and distribute litter on their excrement, and thus, about the tray. Because of the shallowness of the prior art devices, cats tend to "kick" the litter and excrement fragments out of the tray.

It would, therefore, be advantageous if a device to substantially eliminate the above disadvantages were available. The above difficulties can be effectively and efficiently overcome by use of the device and method of the instant invention. Specifically, a rotatable enclosure or chamber is charged with litter through a closeable first opening, which also provides the animal a means of ingress and egress. The opening is draped by an entry curtain, which not only prevents odor from escaping, but also prevents litter from being distributed and otherwise spilled from the box while the cat is performing toilet. After repeated use by the animal, the chamber is rotated to automatically effectively and efficiently separate feces and agglomerated litter. There is no need to manually contact or handle the soiled litter. The separated waste is expelled from the drum through a second sealable opening and deposited into a flexible plastic container, which, when full, is disposed of. If the litter should become so soiled as to warrant replacement, the chamber is simply rotated to an emptying position and tilted to deposit the entire contents of the drum in the flexible plastic container for disposal.

Chemicals, to prevent infection and deodorize the litter, can be evenly and effectively distributed by simply rotating the litter-filled chamber one or more times.

SUMMARY OF THE INVENTION

In a broad aspect, a device for collecting, removing and disposing of small animal feces and agglomerated waste matter comprises a rotatable chamber adapted to contain a particulate litter material; a base means to moveably support the chamber for rotational movement about an axis with respect to the base means; and filter means, disposed and inclined interior the chamber, to selectively separate waste and simultaneously urge the separated matter to exit the chamber as the chamber is rotated. The chamber contains a first closeable opening for animal ingress and egress, and a second sealable opening through which the waste matter is expelled. The filter means, which is a permeable surface, has a porosity such that unsoiled particulate matter passes easily therethrough, but animal waste and agglomerated soiled litter is selectively retained. The permeable surface is disposed within the chamber in an inclined relationship with respect to the second opening such that the combination of gravity and the selectively restrictive surface cooperate, as the chamber is rotated, to continuously urge the retained matter toward the second opening for ultimate expulsion from the chamber.

In accordance with one embodiment, the filter means forms a wedge-shaped volume having a cut-away forward portion and a permeable rearward portion. In another embodiment, the filter means is a continuous helical-shaped, permeable surface circumferentially disposed interior the length of the chamber.

According to a preferred embodiment, the filter means comprises at least two curved, porous surfaces situated such that a first such surface leads a second such surface with respect to the direction of drum rotation; and the second such surface communicates with the second sealable opening for expulsion of separated waste matter. Thus, the first surface contacts the litter to separate the waste matter as the chamber is rotated, while simultaneously urging the separated matter along the curved porous surface to contact the second surface. The curvature of the second surface is such that the rotation of the chamber urges the retained matter through the second opening, to exit the chamber as rotation is completed.

A method for removing small animal excrement from particulate litter in a rotatable chamber containing a permeable, circumferentially disposed filter, comprises the step of rotating the chamber to urge the filter against a volume of soiled litter such that the combination of gravity and the incline of the permeable filter continuously separate and urge the agglomerated matter toward ultimate expulsion from the chamber.

BRIEF DESCRIPTION OF THE DRAWINGS

The novel features believed characteristic of the invention are set forth in the appended claims. The invention itself, however, as well as the advantages thereof, are best understood by reference to the following detailed description of illustrative embodiments taken in conjunction with the accompanying drawings in which:

FIG. 3 is a front elevation with the ingress curtain removed to show the relationship of the filter segments within the chamber;

FIG. 4 is the device of FIG. 3 which has been rotated;

FIG. 5 is the device of FIG. 4 in the emptying position;

DETAILED DESCRIPTION OF THE DRAWINGS

Figure 1:
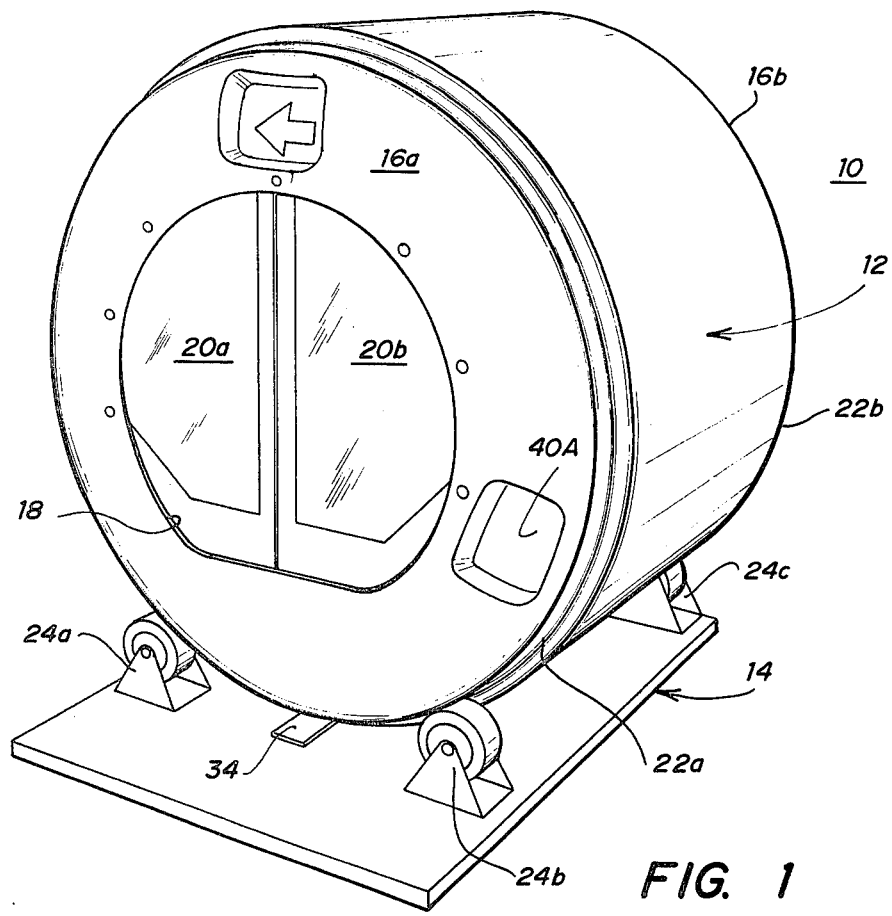
FIG. 1 is a front perspective view of the device positioned for use in accordance with the instant invention.

Referring now to the drawings wherein like reference characters designate like or corresponding parts throughout the several views, particularly to FIG. 1, there is shown a device 10 for collecting and removing small animal excrement from particulate matter.

Figure 2:
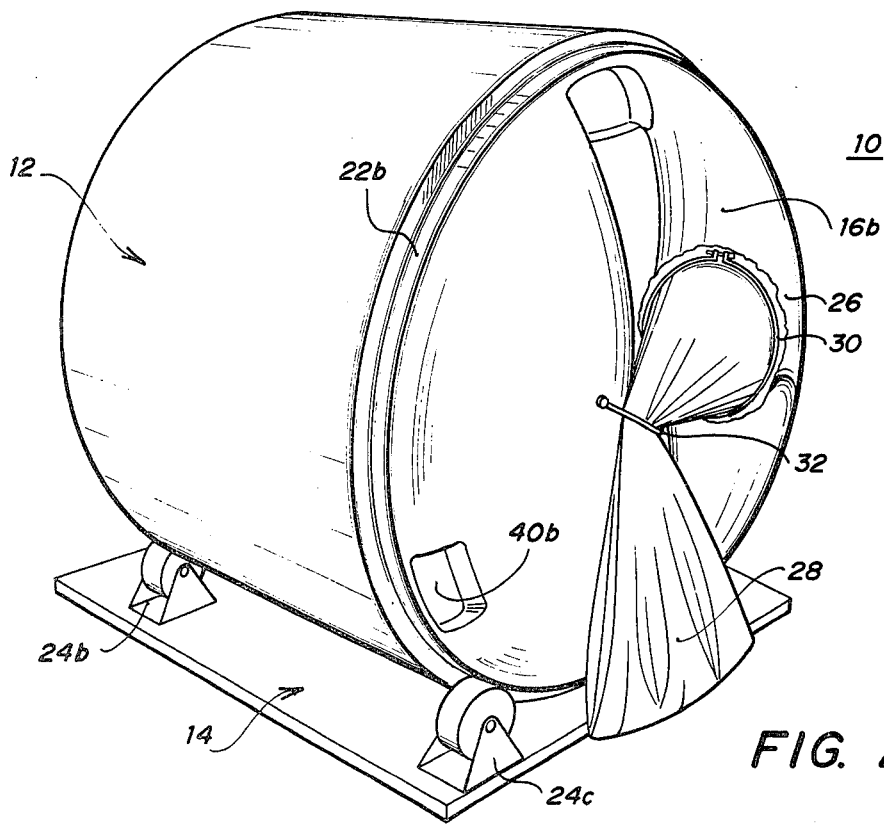
FIG. 2 is a rear perspective view of the device, as shown in FIG. 1.

FIG. 1 is a front elevation of device 10 having the major components of a rotatable chamber or drum 12 mounted on a base assembly 14. The rotatable assembly is now described concurrently with a reference to FIG. 2. The rotatable assembly is a chamber which includes circular end plates 16a and 16b, and a surface segment fitted to the end plates to define a cylindrical shape. Circular end plate 16a houses a closeable opening 18 for animal ingress and egress. Covering the opening 18 are curtains 20a and 20b to sealably close the opening. Circular end plate 16b, as shown in FIG. 2, contains an opening which defines a male spout 26 which is adapted to communicate with the open end of a flexible collection bag 28. The bag 28 is secured to spout 26 by means of a cinching collar 30. Bag 28 passes through a restraining loop 32, which is secured to the end plate 16b. When the drum 12 is positioned as in FIG. 2, the restraining loop 32 operates to isolate the contents of bag 28 from communication with the interior of the chamber.

The surface segment contains annular grooves or raceways 22a and 22b, which matingly accept roller assemblies 24a-d to rotatably support the chamber on base 14. A latch 34 mounted on base 14 resiliently engages the surface segment to stabilize the chamber 12 during use.

As shown in FIGS. 3 through 5, interior cylinder 12 are two filter segments 36 and 38. It will be realized that in the interest of clarity, the curtains 20a and 20b, as well as the litter material, are not depicted in FIGS. 3, 4 and 5. The filter segments 36 and 38, as shown in FIGS. 3 to 5 are curved assemblies made preferably of a rigid plastic material. Each segment can best be defined as a "grate", having spacings or openings between the elements of a size sufficient to allow clean particulate litter material to pass therethrough, but to restrain and thus separate the soiled agglomerated litter and solid animal excrement.

The leading filter segment 36 contacts the inside drum surface, and inclines rearwardly towards the trailing filter segment 38. Trailing filter segment 38 is positioned with respect to leading filter segment 36, so as to accept the restrained and separated contents of the leading filter segment at a certain position of drum rotation. Trailing segment 38 communicates with the spout 26 (not shown), through which the retained matter is expelled. Trailing segment 38 is inclined and curved so as to cradle the separated waste matter during drum rotation until the drum position is reached (FIG. 5), such that the waste matter is expelled by gravity through the spout 26 (not shown).

In operation, the chamber 12 is filled with an appropriate amount of litter through opening 18. The chamber is positioned for use as shown in FIG. 1. At this point, suitable disinfectants and air fresheners may be added to the litter if desired. The drum is rotated once or twice to admix the chemicals with the litter.

After use by the animal, the soiled litter is cleaned as follows: The latch 34 is disengaged and the drum assembly 12 rotated by the operator in the direction of the arrow (counterclockwise) from the "use" position, as shown in FIG. 1, to a position, as shown in FIG. 3. As the drum is rotated, the leading filter segment 36 contacts the particulate material to filter or sift the material through the grating. Agglomerated, soiled litter and solid fecal particles are selectively retained on the top surface of the grating as the segment continues to move through the litter. As the drum is further rotated through the position in FIG. 3 to that of FIG. 4, substantially all of the litter material is caused to pass through the leading filter segment 36. Simultaneously, the retained matter is urged by a combination of gravity and the incline of the filter segment 36 along the top surface of the grate toward the rear of the chamber 12. As the chamber 12 is rotated through the position shown in FIG. 4, the retained waste matter is transferred from the leading filter segment 36 to the trailing filter segment 38. As the chamber 12 is further rotated from the position as shown in FIG. 4 to that of FIG. 5, the retained material is urged by gravity and the curvature of the trailing segment 38 toward the spout 26 (not shown) to ultimately be expelled from the chamber 12 into the bag 28. When the device is positioned, as in FIG. 5, bag 28 (not shown) hangs freely through the restraining loop 32 to receive the separated soiled matter and excrement. As the chamber 12 is rotated through the position shown in FIG. 5 to its use position (FIG. 1), a cleaning cycle is completed. Once returned to the use position, the restraining loop 32 cordons the bag 28 (as shown in FIG. 2) to sealably isolate the excrement from the chamber. As can be seen, this substantially diminishes the odor inside the chamber and diminishes the chance of infection, etc.

When the litter inside the chamber becomes so soiled as to warrant removal, the restraining loop is detached; the drum is rotated to a position such that contents of the drum may be easily poured from spout 28 (FIG. 3); lifted off base 14 by means of a pair of recessed handles 40a and 40b; and tilted rearwardly so as to dispose spout 26 in a downward position. The contents of the chamber 12 then empties into the collection bag 28.

The materials of construction used for the device in the instant invention are not particularly critical. A wide latitude of choices exist so that local preferences or economics can prevail. It will be realized that the humidity on the inside of the chamber will be quite high. An appropriate coating of a humidity impervious nature should be utilized on fiber or absorbent materials. Typical construction would involve a molded, single-piece chamber, having plastic curtains for ingress and egress, to provide a sealable opening; suitable hard rubber rollers; plywood base; and the like.

The filter segments are preferably of unitized construction to removably "snap" into position on the interior wall of the drum. Appropriate thermosetting or thermoplastic material is preferred for wearability and resiliency. Galvanized screening or grating can be used, but is not preferred, because of rust. Synthetic webbing, such as monofilament line, can also be used. The preferred distance between successive members of the grating is from about ¼ inch to ⅜ inch, but may be varied, depending on the size of the unsoiled litter. The only crucial criteria is that the unsoiled litter pass freely between the members, while agglomerated litter, i.e. that which is stuck together by soiling, will not pass freely therethrough. It will be realized that in accordance with the preferred embodiment, the two filter segments need not be physically separated; and, in fact, may be formed as a single contiguous surface, being annularly disposed in the indicated relationship one to the other.

Many modifications to the basic devices will become immediately apparent to the skilled artisan. For example, it will be appreciated by the skilled artisan that the opening for ingress and egress is preferably substantially coincident with the axis of chamber rotation. This need, however is obviated when a means for sealing the opening to prevent litter spillage during rotation is utilized. Likewise, the restraining loop need not be used to hold the collection bag. While this loop functions as a restraint for the bag during rotation, and thus is preferred, the sealing function performed by the loop can be accomplished by, for example, a gravity sealing, hinged door located within spout 26. The gravity sealing door would be closed when the chamber is in the "use" position, as depicted in FIG. 1.

Figure 6:
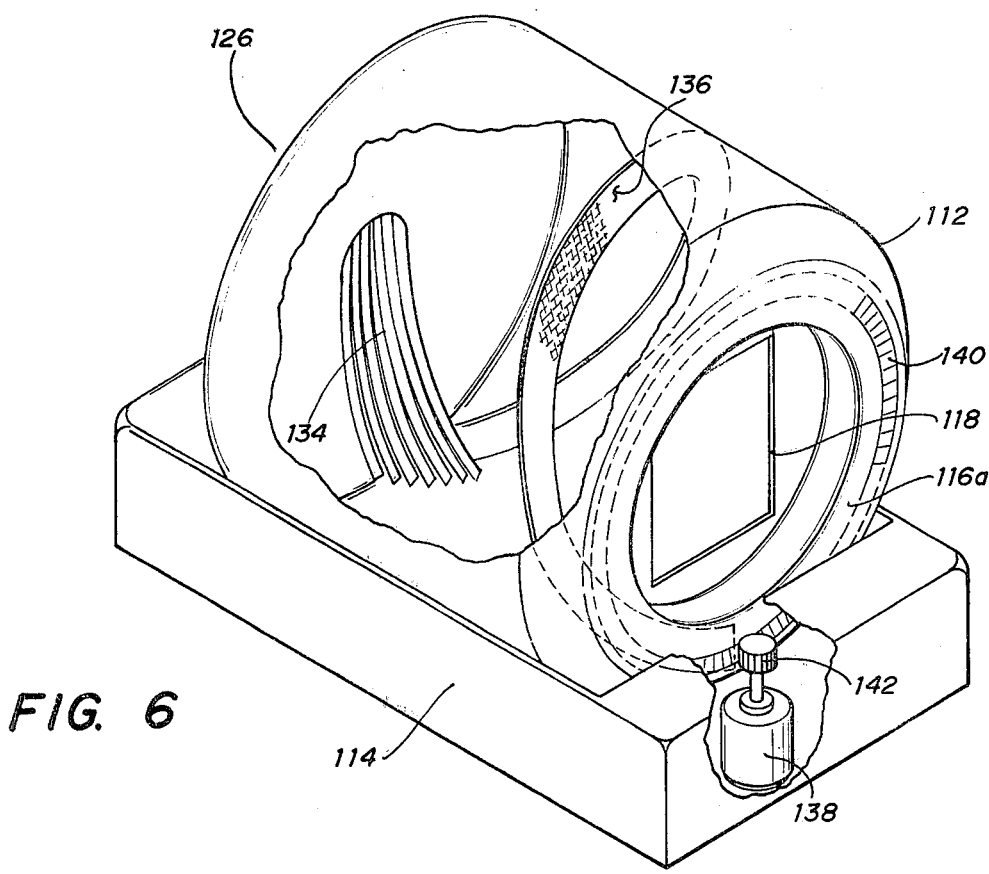
FIG. 6 is a cut-away view of the device in accordance with another embodiment of the instant invention.

According to another embodiment, as shown in FIG. 6, the filter means is a continuous helical-shaped, permeable surface, circumferentially disposed interior the length of the chamber. The drum is rotated by mechanical means. Referring to FIG. 6, a rotatable chamber 112 is rotationally supported on a base assembly 114. An annular pawl 140 is disposed circumferentially on the end plate 116a about opening 118. A motor means 138 is rigidly seated within the base assembly 114 and positioned so that teeth of the drive wheel 142 matingly engage the pawl 140, such that when the motor 138 is energized, the chamber 112 is caused to rotate.

Within the confines of base assembly 114 are contained a plurality of rubber-coated rollers (not shown), which rotatably support the chamber 112 on the base 114. Interior the chamber 112 is a helical porous raceway or filter 136 circumferentially disposed the length of the chamber 112. Grating 134 communicates on one end with spout 126 (not shown) and on the other with the end of raceway 136. The filter 136 is disposed in an angular relation to the drum such that the restrained waste is urged along the helical surface by gravity during a complete rotation of the chamber 112.

In operation, the motor means 138 is energized. Rotation of the chamber 112 causes filter 136 to pass continuously through the litter, restraining waste and soiled agglomerated material. The retained matter is transferred to the grating 134, to exit via the spout 126 in the rear of the chamber.

Figure 7:
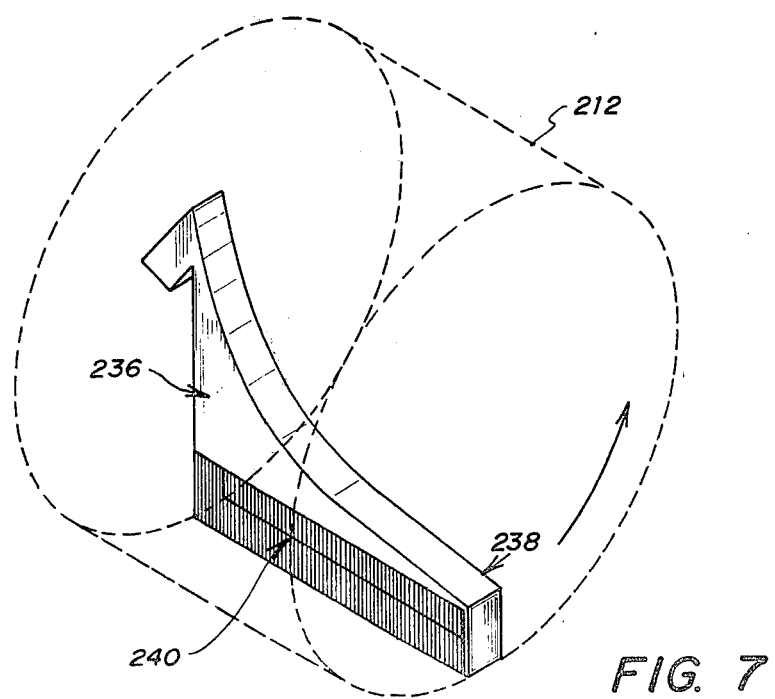
FIG. 7 is a cut-away of the device in accordance with a further embodiment of the instant invention.

In accordance with yet another embodiment, as shown in FIG. 7, the filter is a wedge-shaped assembly disposed interior the chamber. Referring to FIG. 7, a rotatable chamber 212 is rotationally supported on a suitable base (not shown). The filter assembly 236 is disposed interior the chamber 212 and forms a wedge-shaped volume having a cut-away forward portion 238. Porous surface 240, through which unsoiled litter passes freely, is disposed rearward of cut-away portion 238. An exit spout 226 communicates with the interior of the filter volume.

In operation, the entirety of the soiled litter is "scooped" into the cut-away forward portion 238 as the drum is rotated in the direction of the arrow. The unsoiled litter passes through the porous surface and remains inside the chamber for reuse, while the feces and soiled agglomerated litter are retained inside the wedge-shaped filter assembly 236. The angled portion of the filter assembly urges the retained matter towards the exit spout 226. The waste is ultimately expelled as the chamber is rotated through a complete cycle.

It should now be realized that a number of filter configurations are operable in accordance with the instant invention. The embodiment utilizing two filter segments is preferred, primarily because this embodiment appears to leave the animal the most unobstructed room within the chamber. A combination of the embodiment in FIG. 1 and that of FIG. 6 is also possible, wherein the porous surfaces are fixidly disposed on the interior surface of the drum, but are discontinuous and staggered in relation one to the other. In this embodiment (not shown), each successive porous segment receives the retained matter of the previous staggered segment, in a continuum, until the retained contents exit the chamber.

While the invention has been explained in relation to its preferred embodiments, it is to be understood that various modifications thereof will become apparent to those skilled in the art upon reading the specification and is intended to cover such modifications as fall within the scope of the appended claims.

What is claimed is:
1. A device for selectively removing small animal feces and agglomerated waste matter from soiled pet litter comprising:
 a rotatable chamber adapted to contain said litter, the wall of said chamber having at least one opening suitable for animal ingress and egress, and a second opening substantially coincident with the axis of rotation for removal of said feces and waste;
 a base to moveably support the chamber for rotational movement about an axis with respect to the base; and,
 at least one selectively restrictive, porous surface, rigidly situated interior said chamber and communicating with said opening for removal of feces and waste, said porous surface being inclined with respect to the interior drum surface, such that the combination of gravity and the selectively restrictive surface cooperate as the chamber is rotated to retain the waste matter on said surface, while simultaneously moving the retained matter toward said second opening to ultimately exit the chamber.

2. The device of claim 1 wherein said opening suitable for animal ingress and egress is closeable, to prevent escape of odor from the chamber, and wherein said second opening is sealable.

3. The device of claim 2 wherein the selectively restrictive porous surfaces comprises:
 at least two curved surfaces wherein a first surface leads a second such surface with respect to the direction of chamber rotation, and the second surface communicates with said second sealable opening for explusion of separated waste matter such that the first surface contacts the litter to separate the waste matter as the chamber is rotated, while simultaneously urging the separated matter along the curved porous surface to contact the second surface and the curvature of the second surface urges the retained matter through the second opening, to exit the chamber as rotation is completed.

4. The device of claim 2 wherein the selectively restrictive porous surface comprises a continuous helical-shaped, permeable raceway circumferentially disposed interior the length of the chamber in an angular relation to the chamber such that the restrained waste is urged along the surface by gravity as the chamber is rotated.

5. The device of claim 2 wherein the selectively restrictive porous surface comprises:
a wedge-shaped volume disposed interior the chamber, having a cut-away forward portion for entrance of soiled litter and a porous rearward portion such that waste material is selectively retained inside the volume as the chamber is rotated.

6. The device of claim 3 further comprising a flexible collection means, exterior the chamber, which communicates with said second opening.

7. A method for removing small animal excrement from particulate litter in a rotatable chamber containing a permeable, circumferentially disposed, stationary filter, comprises the step of:
rotating the chamber to urge the filter against a volume of soiled litter such that the combination of gravity and the incline of the permeable filter continuously separate and urge the agglomerated matter toward ultimate expulsion from the chamber.

* * * * *